United States Patent [19]

Sato et al.

[11] Patent Number: 4,766,805
[45] Date of Patent: Aug. 30, 1988

[54] WINDSHIELD DEFROSTER SYSTEM FOR VEHICLE

[75] Inventors: Yuzo Sato; Hiroshi Saito; Toshinori Sakamoto, all of Hiroshima, Japan

[73] Assignee: Mazda Motor Corporation, Japan

[21] Appl. No.: 3,847

[22] Filed: Jan. 16, 1987

[30] Foreign Application Priority Data

Jan. 17, 1986 [JP] Japan .................................. 61-8321
Jan. 17, 1986 [JP] Japan .................................. 61-8322

[51] Int. Cl.$^4$ ............................................. B60H 1/10
[52] U.S. Cl. ...................................... 98/2.07; 98/2.09; 98/2.16
[58] Field of Search ................... 98/2.03, 2.04, 2.07, 98/2.08, 2.09, 2.16

[56] References Cited

U.S. PATENT DOCUMENTS

| | | | |
|---|---|---|---|
| 3,359,881 | 12/1967 | Lamb | 98/2.09 |
| 3,427,950 | 2/1969 | Paroy | 98/2.07 |
| 3,719,135 | 3/1973 | Breitschwerdt et al. | 98/2.07 |
| 4,173,174 | 11/1979 | Vinko et al. | 98/2.08 |
| 4,223,754 | 9/1980 | Mizuno | 98/2.09 |
| 4,437,393 | 3/1984 | Stolz et al. | 98/2.07 |
| 4,522,114 | 6/1985 | Matsuno | 98/2.09 |
| 4,588,351 | 5/1986 | Miller | 98/2.09 |

FOREIGN PATENT DOCUMENTS 57-125619 8/1982 Japan .

Primary Examiner—Larry I. Schwartz
Attorney, Agent, or Firm—Gerald J. Ferguson, Jr.

[57] ABSTRACT

In a windshield defroster system for a vehicle, the lower edge of the windshield is fixed to the upper side of the front portion of a cowl box disposed in front of the passenger compartment, and a defroster duct extends along the upper side of the cowl box from the rear side of the same to a position near the lower edge of the windshield and has an air plenum on the front edge portion thereof.

22 Claims, 4 Drawing Sheets

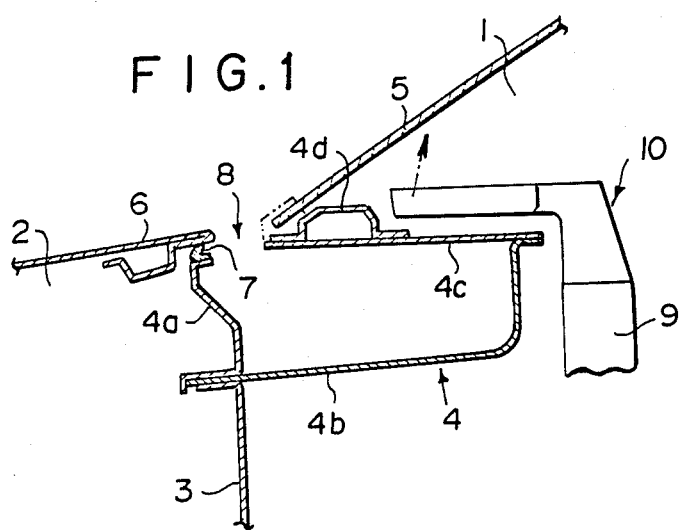
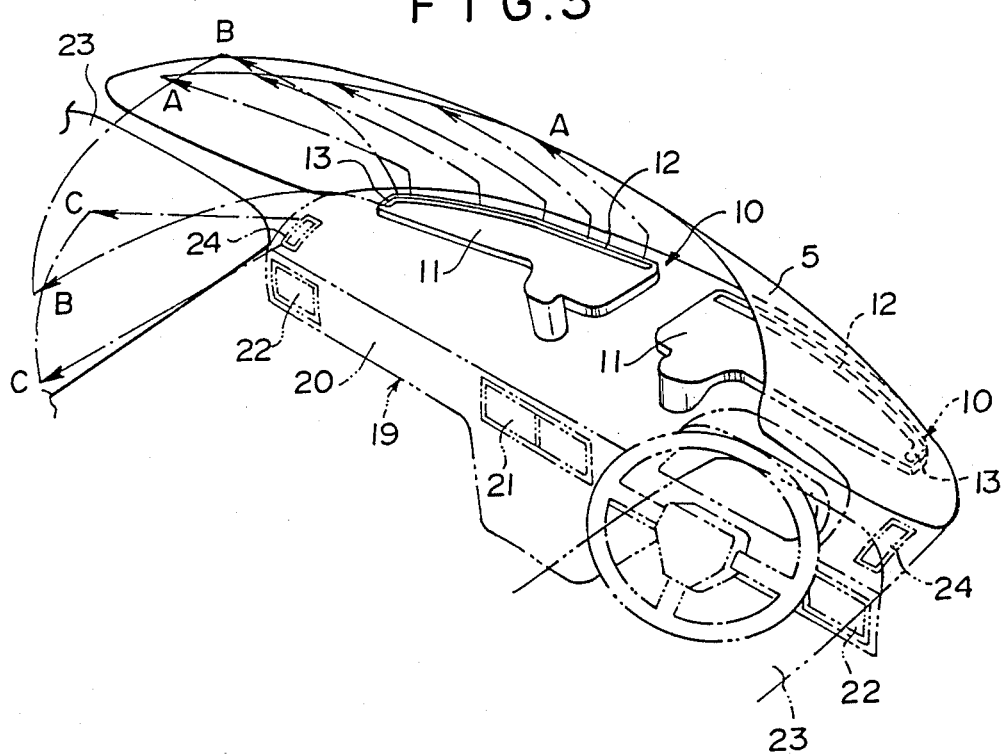

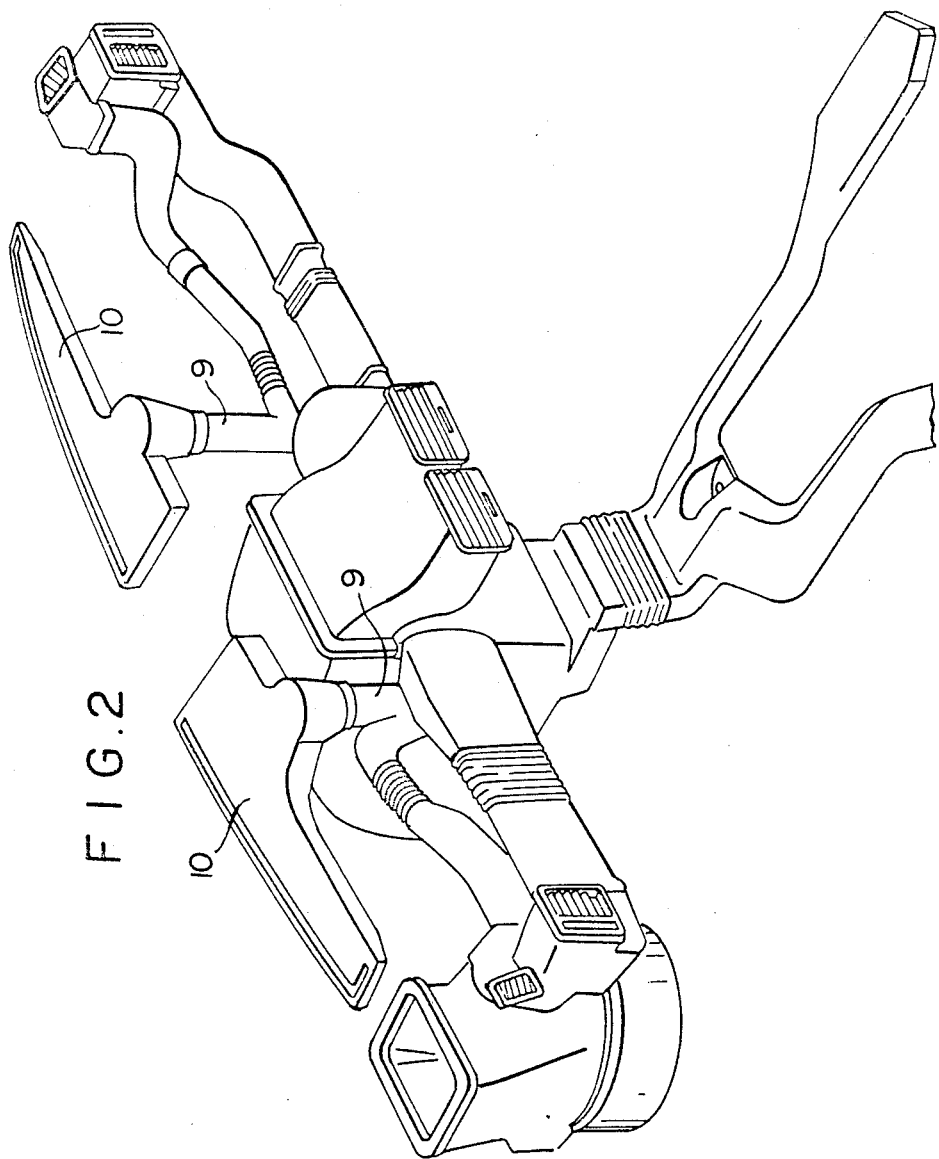

WINDSHIELD DEFROSTER SYSTEM FOR VEHICLE

BACKGROUND OF THE INVENTION

1. Field of the Invention

This invention relates to a windshield defroster system for a vehicle, and more particularly to a windshield defroster system for a vehicle which is particularly useful for obtaining a sufficient defrosting effect in a vehicle having a windshield mounted at a relatively large angle to the vertical.

2. Description of the Prior Art

A vehicle is generally provided with a windshield defroster for blowing over the windshield conditioned air introduced from an air conditioner in order to remove or prevent frost on the windshield.

Conventionally, the windshield defroster system includes a defroster duct which is disposed on the rear side of the cowl box and has an air plenum for blowing out conditioned air on the upper side thereof as disclosed in Japanese unexamined Utility Model Publication No. 57(1982)125619, for instance. In the conventional defroster system, the direction of the conditioned air blown from the air plenum of the defroster duct depends upon the direction of the approach of the defroster duct formed along the rear side of the cowl box and is controlled so that conditioned air impinges upon the windshield at a predetermined portion at a predetermined angle to flow along the windshield over a desired range.

To improve the profile of a vehicle, the lower edge of the windshield is sometimes positioned more forward than usual so that the windshield is at a larger angle to the vertical. In order to utilize the interior space of the cowl box for disposing a ventilation air passage or a wiper system, generally the lower edge of the windshield is fixed to the upper side of the front portion of the cowl box with the cowl box being arranged to project toward the passenger compartment to a large extent. Accordingly, in the case of the conventional defroster system, conditioned air cannot be caused to impinge upon the windshield at a desired height and in a desired direction, and as a result, the lower portion of the windshield cannot be sufficiently defrosted.

The above problem may be overcome by displacing the rear side of the cowl box below the lower edge of the windshield. However, this approach involves a different problem of the length of the cowl box (as measured in the longitudinal direction of the vehicle) being inherently shortened since the engine room cannot be narrowed, and accordingly, the displacement of a front panel to be accommodated by deformation of the cowl box upon collision is minimized. This is undesirable with respect to preventing the windshield falling out. At the same time, if the interior space of the cowl box is narrowed, the ventilation air passage and/or the wiper system cannot be disposed in the cowl box.

SUMMARY OF THE INVENTION

In view of the foregoing observations and description, the primary object of the present invention is to provide a windshield defroster system which can provide sufficient defrosting effect even in a vehicle having a largely inclined windshield without sacrificing the interior space of the cowl box.

In accordance with the present invention, the lower edge of the windshield is fixed to the upper side of the front portion of the cowl box disposed in front of the passenger compartment, and the defroster duct extends along the upper side of the cowl box from the rear side of the same to a position near the lower edge of the windshield and has an air plenum on the front edge portion thereof.

BRIEF DESCRIPTION OF THE DRAWINGS

FIG. 1 is a fragmentary cross-sectional view of a windshield defroster system in accordance with an embodiment of the present invention, FIG. 2 is a perspective view showing the windshield defroster system with the instrument panel and the cover removed, FIG. 3 is a perspective showing distribution of the conditioned air blown by the defroster system.

DESCRIPTION OF THE PREFERRED EMBODIMENT

Figure 4:
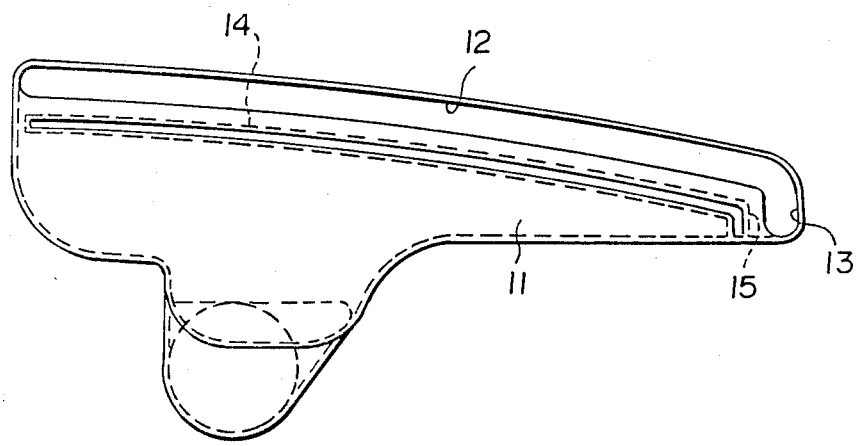
FIG. 4 is a plan view of the defroster duct employed in the defroster system.

As shown in FIG. 1, a lower dashboard 3 is disposed on the front side of a passenger compartment 1 to separate the passenger compartment 1 from an engine room 2. A cowl box 4 is provided above the lower dashboard 3. The cowl box 4 comprises a cowl front panel 4a flush with the lower dashboard 3, a cowl lower panel 4b which is connected to the lower edge of the cowl front panel 4a and projects toward the passenger compartment 1 in an L-shape, a cowl upper panel 4c the rear edge of which is connected to the rear upper edge of the cowl lower panel 4b, and a reinforcement 4d fixed to the upper side of the front portion of the cowl upper panel 4c. On the upper side of the front portion of the cowl box 4 is fixedly mounted the lower edge of a windshield 5 in a known manner. The space between the upper edge of the cowl front panel 4a and the rear edge of a hood 6 is sealed by a sealing member 7, and a ventilation air introducing opening 8 is formed between the rear edge of the hood 6 and the front edge of the cowl upper panel 4c. Though not shown, wiper arxs swing through the ventilation air introducing opening 8.

Figure 5:
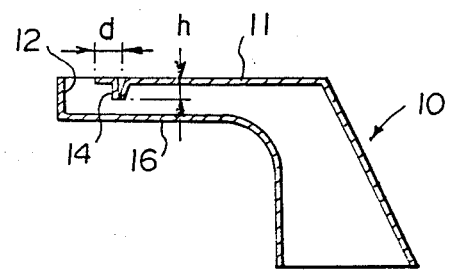
FIG. 5 is a cross-sectional view of the defroster duct.
Figure 6:
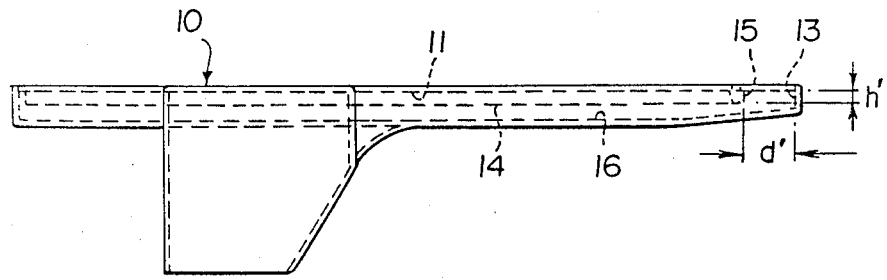
FIG. 6 is a front view of the defroster duct.

On the rear side of the cowl box 4 are disposed right and left intermediate ducts 9 (See also FIG. 2.) connected to an air conditioner (not shown), and a defroster duct 10 is connected to the upper end of each intermediate duct 9 to extend from the rear side of the cowl box 4 to the front portion thereof above the cowl box 4. As shown in FIGS. 2 and 3, the defroster duct 10 is like a flat chamber the front edge of which is bowed like a half-bow along the lower edge of the windshield 5. A front air plenum 12 is formed over the entire length of the front edge portion of the top wall of the defroster duct 10. A side air plenum 13 is formed in the outer side edge portion of the top wall of the defroster duct 10 to extend in the longitudinal direction of the vehicle body and to merge into the front air plenum 12. The front air plenum 12 is directed so that conditioned air blown therethrough flows rearwardly upwardly along the windshield 5. In this embodiment, the front air plenum 12 opens upward in the front edge portion of the top wall 11 of the defroster duct 10 and extends in the transverse direction of the vehicle body along the front edge portion. As shown in FIGS. 4 to 6, a front wind direction control wall 14 for controlling the direction of conditioned air blown through the front air plenum 12 is provided in the defroster duct 10 to project downward from the top wall 11 a height h at an appropriate distance d from the front air plenum 12. Further, a side wind direction control wall 15 for controlling the direction of conditioned air blown through the side air plenum 13 is provided in the defroster duct 10 to project downward from the top wall 11 a height h' at an appropriate distance d' from the side air plenum 13. The side wind direction control wall 15 merges into the front wind direction control wall 14. Since the defroster duct 10 is connected to the intermediate duct 9 at the transversely inner edge portion, the pressure and the amount of blown air can be reduced at the transversely outer edge portion of the defroster duct 10 where the distance of the approach is relatively long. In order to avoid this, the bottom wall 16 of the defroster duct 10 is arranged to gradually approach the top wall 11 toward the outer edge portion.

Figure 7:
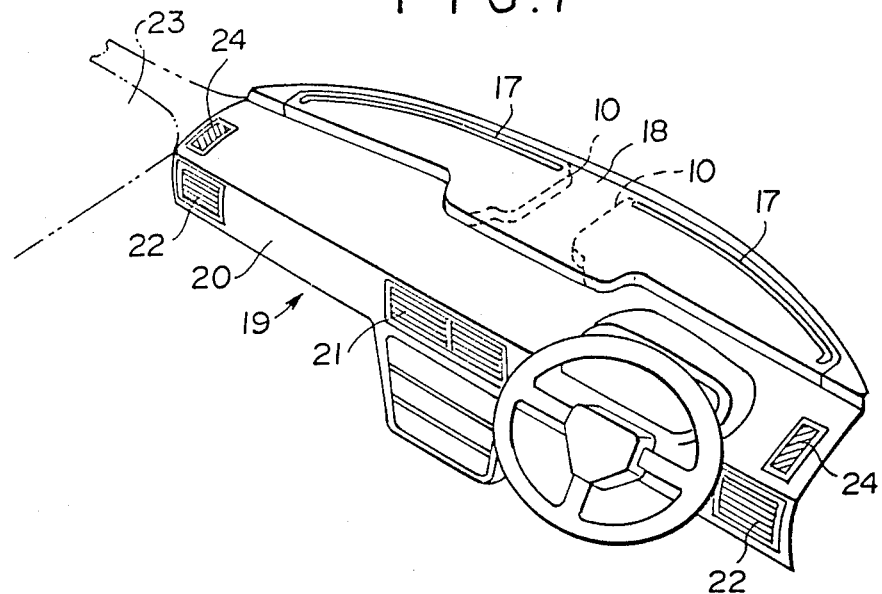
FIG. 7 is a perspective view of the instrument panel.
Figure 8:
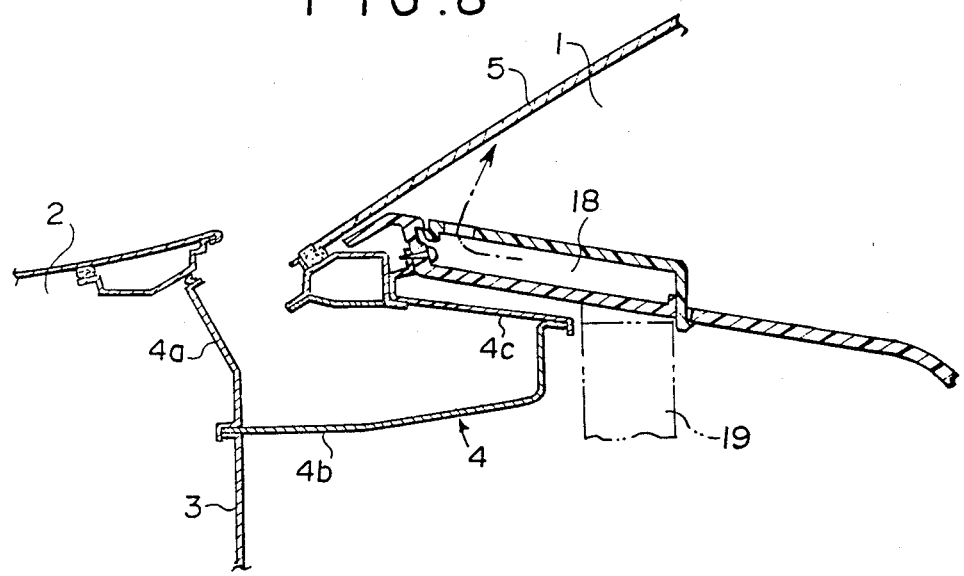
FIG. 8 is a cross-sectional view of the instrument panel showing the cover.

As shown in FIGS. 7 and 8, both the defroster ducts 10 are covered with a cover 18 having a pair of half-bow like openings 17 so as not to interfere with the flow of the conditioned air blown through the front air plenum 12 and the side air plenum 13. The cover 18 forms a part of an instrument panel 19 and is removably mounted on the body portion 20 of the instrument panel 19. The instrument panel 19 is provided with a central air deflector grill 21 and right and left air deflector grills 22 through which conditioned air from the air conditioner is blown into the passenger compartment 1. Further, right and left side demisters for demisting the side windows are provided in the instrumert panel 19 in a known manner.

With the arrangement described above, the conditioned air is introduced into the defroster ducts 10 by way of the intermediate ducts 9, and is blown out through the front air plenums 12 and the side air plenums 13 toward the windshield 5. The dynamic pressure of the conditioned air introduced to the defroster ducts 10 from the intermediate ducts 9 is substantially cancelled due to an increase in the cross-sectional area of the path and due to collision of the conditioned air against the wind direction control walls 14 and 15, and the conditioned air is blown out through the air plenums 12 and 13 mainly under static pressure. As a result, the blowing pressure through the front air plenum 12 becomes uniform in the transverse direction of the vehicle body, and accordingly the air flow distribution can be controlled in proportion to the width of the front air plenum 12 as measured in the longitudinal direction. The pressure and flow of the conditioned air blown through the side air plenum 13 can be controlled in the same manner. The direction of the conditioned air blown through the front air plenum 12 can be optionally set depending upon the height and distance from the air plenum 12 of the front wind direction control wall 14. Accordingly, as shown by arrows A in FIG. 3, the conditioned air can be blown like a curtain against the windshield 5 at a predetermined distance from the lower edge thereof to flow rearwardly upwardly along the windshield 5. The direction of the conditioned air blown through the side air plenum 13 can be optionally set depending upon the height and distance from the air plenum 13 of the side wind direction control wall 15. Accordingly, as shown by arrows B in FIG. 3, the conditioned air can be blown over ranges from side edge portions of the windshield 5 to the front edge portions of the side windows 23. Arrows C in FIG. 3 show the direction of the conditioned air blown through the side demister 24.

In accordance with this embodiment, since the defroster ducts 10 are disposed above the cowl box 4, and the front air plenum 12 and the side air plenum 13 continuous with the front air plenum 12 are provided in the front edge portion and the outer edge portion of each defroster duct 10, the longitudinal dimension of the cowl box 4 can be made sufficiently large without being limited by the defroster ducts 10 and the intermediate ducts 9. Accordingly, displacement of the lower dashboard 3 to be accommodated by deformation of the cowl box 4 upon a head-on collision can be made sufficiently large, thereby effectively preventing falling-out of the windshield 5. At the same time, since the interior space of the cowl box 4 can be sufficiently large, sufficient room can be reserved for the ventilation air passage and/or the wiper system in the cowl box 4. Especially when the defroster duct 10 is formed flat, the height of the cowl box 4 can be increased so that the windshield is more effectively prevented from falling out, and at the same time, the inner volume of the cowl box 4 can be enlarged so that the cross section of the ventilation air passage can be enlarged and the wiper system can be disposed with more freedom. Further the flat defroster duct 10 is advantageous in that the height of the space between the cowl box 4 and the instrument panel 6 in which the defroster duct 10 is to be disposed may be low and accordingly the instrument panel 6 can be disposed relatively low.

Though, in the embodiment described above, the direction of the conditioned air blown through the air plenums 12 and 13 is controlled by the wind direction control walls 14 and 15, a facing having a louver may be provided on the front air plenum 12, the side air plenum 13 or the openings 17 of instrument panel 6 in addition to or instead of the wind direction control walls 14 and 15 so that the direction of the conditioned air is controlled by the louver.

Further, though in the embodiment described above, the front air plenum 12 and the side air plenum 13 are continuous with each other, they may be separated.

Further, if desired, the side demister 24 may be omitted.

We claim:

1. A windshield defroster system in which conditioned air discharged from an air conditioner is blown through a defroster duct toward the windshield from below, characterized in that the lower edge of the windshield is fixed to the upper side of a front portion of a cowl box disposed in front of the passenger compartment, and said defroster duct extends along the upper side of the cowl box from the rear side of the same to a position near the lower edge of the windshield and has a front air plenum on the front edge portion thereof; the cowl box has a cowl upper panel forming the top surface thereof, and the lower end of the windshield is fixed to the front portion of the cowl upper panel; the defroster duct disposed on the cowl upper panel, has a portion for receiving conditioned air disposed in the rear of the cowl box in the passenger compartment side and an open front portion for discharging the air toward the lower portion of the windshield disposed in the vicinity of the lower end of the windshield; the front portion extends in the transverse direction of the vehicle body along the lower end of the windshield; the defroster duct is of a substantially flat structure extending from the portion for receiving conditioned air to the front portion.

2. A windshield defroster system as defined in claim 1 in which a reinforcement is provided on the upper side of the cowl box and the windshield is supported on the reinforcement.

3. A windshield defroster system as defined in claim 2 in which said cowl box comprises a cowl front panel standing from a dashboard panel, an L-shaped cowl lower panel and a cowl upper panel.

4. A windshield defroster system as defined in claim 3 in which a seal member is provided on the upper edge of the cowl front panel to seal the space between the upper edge of the cowl front panel and the rear edge of the hood.

5. A windshield defroster system as defined in claim 1 in which said defroster duct is like a flat chamber extending in the transverse direction of the vehicle body along the top surface of the cowl box.

6. A windshield defroster system as defined in claim 5 in which the front edge of the defroster duct is bowed like a half-bow along the lower edge of the windshield.

7. A windshield defroster system as defined in claim 6 in which said air plenum is formed along the front edge portion of the top wall of the defroster duct.

8. A windshield defroster system as defined in claim 7 in which a side air plenum is provided on the outer side of the defroster duct to extend in the longitudinal direction of the vehicle body.

9. A windshield defroster system as defined in claim 8 in which a side wind direction control wall for controlling the direction of conditioned air blown through the side air plenum is provided in the defroster duct to project downward from the top wall at an appropriate distance from the side air plenum.

10. A windshield defroster system as defined in claim 7 in which a front wind direction control wall for controlling the direction of conditioned air blown through the front air plenum is provided in the defroster duct to project downward from the top wall at an appropriate distance from the front air plenum.

11. A windshield defroster system as defined in claim 1 in which a front wind direction control wall for controlling the direction of conditioned air blown through the front air plenum is provided in the defroster duct to project downward from the top wall at an appropriate distance from the front air plenum.

12. A windshield defroster system as defined in claim 11 in which a side air plenum is provided on the outer side of the defroster duct to extend in the longitudinal direction of the vehicle body.

13. A windshield defroster system as defined in claim 12 in which a side wind direction control wall for controlling the direction of conditioned air blown through the side air plenum is provided in the defroster duct to project downward from the top wall at an appropriate distance from the side air plenum.

14. A windshield defroster system as defined in claim 1 in which a side air plenum is provided on the outer side of the defroster duct to extend in the longitudinal direction of the vehicle body.

15. A windshield defroster system as defined in claim 1 in which said defroster duct is connected at the rear edge thereof to an intermediate duct extending upward along the rear side of the cowl box.

16. A windshield defroster system as defined in claim 15 in which said defroster duct is provided for each of right and left halves of the windshield, and the intermediate duct is provided for each defroster duct.

17. A windshield defroster system as defined in claim 15 in which said defroster duct comprises a lower portion extending upward along the rear side of the cowl box and an upper portion extending above the cowl box.

18. A windshield defroster system as defined in claim 17 in which said defroster duct is enlarged in the transverse direction of the vehicle body from the lower portion toward the upper portion thereof.

19. A windshield defroster system as defined in claim 1 in which said defroster duct has a flat chamber therewithin for passing the air and a wall projected toward the inner portion of said chamber, said wall being disposed between said portion for receiving conditioned air and said front portion and extending in the transverse direction along said front portion.

20. A windshield defroster system as defined in claim 19 in which said defroster duct is disposed on each of the left and right sides in the transverse direction of the vehicle.

21. A windshield defroster system as defined in claim 20 in which said defroster duct is covered with a cover having a half-bow like opening extending along the windshield for passing the air from said defroster duct.

22. A windshield defroster system in which conditioned air dishcarged from an air conditioner is blown through a defroster duct toward the windshield from below, characterized in that the lower edge of the windshield is fixed to the upper side of a front portion of a cowl box disposed in front of the passenger compartment, and said defroster duct extends along the upper side of the cowl box from the rear side of the same to a position near the lower edge of the windshield and has a front air plenum on the front edge portion thereof; a side air plenum is provided on the outer side of the defroster duct to extend in the longitudinal direction of the vehicle body; said defroster duct is disposed on each of the left and right sides in the transverse direction of the vehicle; said defroster duct is covered with a cover having a half-bow like opening extending along the windshield for passing the air from said defroster duct.

* * * * *